(12) United States Patent
Ha et al.

(10) Patent No.: US 11,001,991 B2
(45) Date of Patent: May 11, 2021

(54) OPTIMIZING LOADING OF A PAYLOAD CARRIER OF A MACHINE

(71) Applicant: Caterpillar Inc., Deerfield, IL (US)

(72) Inventors: Christopher Ha, Champaign, IL (US); Shawn Nainan Mathew, Savoy, IL (US); Yang Liu, Champaign, IL (US); Qi Wang, Pittsburgh, PA (US)

(73) Assignee: Caterpillar Inc., Peoria, IL (US)

( * ) Notice: Subject to any disclaimer, the term of this patent is extended or adjusted under 35 U.S.C. 154(b) by 106 days.

(21) Appl. No.: 16/245,829

(22) Filed: Jan. 11, 2019

(65) Prior Publication Data

US 2020/0224390 A1 Jul. 16, 2020

(51) Int. Cl.
| | |
|---|---|
| *G06K 9/00* | (2006.01) |
| *E02F 9/26* | (2006.01) |
| *H04N 7/18* | (2006.01) |
| *E02F 3/65* | (2006.01) |
| *E02F 3/64* | (2006.01) |
| *G06T 7/20* | (2017.01) |
| *B60R 11/04* | (2006.01) |
| *G06T 7/90* | (2017.01) |
| *G06T 7/50* | (2017.01) |

(52) U.S. Cl.
CPC ................. *E02F 9/26* (2013.01); *H04N 7/18* (2013.01); *B60R 11/04* (2013.01); *E02F 3/6436* (2013.01); *E02F 3/6481* (2013.01); *E02F 3/651* (2013.01); *G06T 7/20* (2013.01); *G06T 7/50* (2017.01); *G06T 7/90* (2017.01)

(58) Field of Classification Search
CPC ......... E02F 9/2045; E02F 9/264; E02F 3/437; E02F 3/434; E02F 9/2033; G06K 9/00214; G06K 9/00791; G06K 2209/09; G06K 9/00771; G06K 9/00671; G05D 1/0234; G05D 1/0255; G05D 1/0274; G06F 30/20; G06T 1/0064; A63H 2200/00; H04N 1/00031; H04N 1/00045; H04N 1/00068; H04N 21/23892; H04N 21/44008; H04N 5/225; H04N 1/3224; H04N 1/32309; G01H 1/00; C09D 11/32; G07D 7/005; G07D 7/0056; G01G 23/01; G07C 5/085
USPC .......... 382/100, 104, 137; 37/411, 416, 414, 37/419
See application file for complete search history.

(56) References Cited

U.S. PATENT DOCUMENTS

| | | | | |
|---|---|---|---|---|
| 4,919,222 A | * | 4/1990 | Kyrtsos | G01G 5/04 177/139 |
| 5,944,764 A | * | 8/1999 | Henderson | E02F 9/2045 342/457 |
| 6,247,538 B1 | | 6/2001 | Takeda et al. | |
| 6,552,279 B1 | * | 4/2003 | Lueschow | G01G 19/10 177/141 |
| 7,839,926 B1 | * | 11/2010 | Metzger | H04N 5/144 375/240.01 |
| 8,229,631 B2 | | 7/2012 | Morey et al. | |

(Continued)

*Primary Examiner* — Guillermo M Rivera-Martinez
(74) *Attorney, Agent, or Firm* — Lee & Hayes, PLLC

(57) ABSTRACT

A method for loading a payload carrier of a machine includes receiving, from a camera on the machine, a two-dimensional image of an interior of the payload carrier as material is loaded into the payload carrier. The method further includes filtering the image to identify a contour of the loaded material and determining an area of the contour. The method further includes controlling a display device indicate the determined area.

16 Claims, 9 Drawing Sheets

(56) References Cited

U.S. PATENT DOCUMENTS

| | | | | |
|---|---|---|---|---|
| 8,593,698 | B2* | 11/2013 | Simske | B41M 3/14 358/3.28 |
| 9,028,312 | B1* | 5/2015 | Wei | A63F 13/28 463/2 |
| 10,832,435 | B1* | 11/2020 | Mathew | B60R 1/002 |
| 2004/0158355 | A1* | 8/2004 | Holmqvist | G05D 1/0274 700/245 |
| 2004/0267474 | A1* | 12/2004 | Drake | E02F 9/26 702/101 |
| 2009/0043460 | A1* | 2/2009 | Morey | E02F 9/26 701/50 |
| 2015/0143913 | A1* | 5/2015 | Adams | G06K 9/00771 73/655 |
| 2016/0289927 | A1* | 10/2016 | Wang | E02F 3/651 |
| 2017/0036539 | A1* | 2/2017 | Steinlage | B60K 23/04 |
| 2017/0039787 | A1* | 2/2017 | Sukumaaran | G07C 5/0808 |
| 2017/0134631 | A1* | 5/2017 | Zhao | G06K 9/0063 |
| 2018/0239849 | A1* | 8/2018 | Martinsson | G06K 9/00214 |
| 2019/0061623 | A1* | 2/2019 | Borkowski | G05D 1/0293 |
| 2019/0121156 | A1* | 4/2019 | Yu | H04N 5/23296 |

\* cited by examiner

OPTIMIZING LOADING OF A PAYLOAD CARRIER OF A MACHINE

TECHNICAL FIELD

The present disclosure is directed to machine production optimization, and more particularly, to production optimization for operation of excavating machines such as a wheel tractor scraper.

BACKGROUND

Earthmoving machines may be used to move earth, rocks, and other material from an excavation site. Often, it may be desirable to move excavated material from an excavation site to another location remote from the excavation site. For example, the material may be loaded onto an off-highway haulage unit that may transport the materials to a dump site. As another example, the material may be excavated by a pull pan drawn behind a tractor, and then hauled, via the pull pan, to the dump site. As a further example, a wheel tractor scraper may be used for excavating, hauling, and dumping the excavated material.

One such machine, a wheel tractor scraper, may be used in an operating cycle to cut material from one location during a load phase, transport the cut material to another location during a haul phase, unload the cut material during a dump phase, and return to an excavation site during a return phase to repeat the operating cycle. The decision to use a wheel tractor scraper, as opposed to some other excavating machine or system, may be based on factors such as the operating cost and the productivity of the machine or system.

The productivity and the cost of operating a machine, or a fleet of machines, may be adversely affected by certain factors. For example, an operator of a wheel tractor scraper may spend too much time in a load cycle relative to the time required to complete a haul cycle, reducing efficiency. Also, utilizing a particularly long load cycle to fully load or perhaps overload a machine may be efficient in terms of real productivity and cost for certain haul cycles, but for other haul cycles may deteriorate productivity and increase cost by increasing tire slip (increased tire wear), burning more fuel, increasing wear on ground engaging tools, and increasing wear on machine structure and powertrain components, for example.

Systems have been designed with a view toward increasing the efficiency of earthmoving machines, including during the loading phase. For example, U.S. Patent Application Publication No. 2016/0289927 to Wang et al. ("the '927 Publication") describes a bowl-monitoring system with a perception sensor that provides a signal to a controller that is indicative of a view of the bowl of the machine. Based on the signal, the controller determines a level of material in the bowl and provides an indication to an operator of the machine of the current loading status of the bowl.

While the system described in the '927 Publication helps increase loading efficiency, the system employs three-dimensional perception sensors such as LiDAR (Light Detection and Ranging) or a stereo camera to monitor the bowl. These types of perception sensors can be expensive, potentially making it cost-prohibitive to install on a fleet of machines, for example. Additionally, three-dimensional image processing may be computationally expensive, requiring increased computing power further increasing the cost of the '927 Publication's solution relative to other types of solutions.

The present disclosure is directed to one or more improvements in the existing technology.

SUMMARY

One aspect of the disclosure is directed to a method for loading of a payload carrier of a machine. The method may include receiving, from a camera on the machine, a two-dimensional image of an interior of the payload carrier as material is loaded into the payload carrier. The method may include filtering the image to identify a contour of the loaded material and determining an area of the contour. The method may include controlling a display device to indicate the determined area.

Another aspect of the disclosure is directed to a camera for assisting loading of a payload carrier of a machine. The camera may include a memory storing instructions and a processor. The processor may be configured to execute the instructions to receive a two-dimensional image of an interior of the payload carrier as material is loaded into the payload carrier and filter the image to identify a contour of the loaded material. The processor may be further configured to execute the instructions to determine an area of the contour and provide a signal to control a display device to indicate the determined area.

Another aspect of this disclosure is directed to a machine. The machine may have a display device and a camera configured to capture a two-dimensional image of an interior of a payload carrier of the machine when material is loaded into the payload carrier. The machine may also have a controller configured to receive the image from the camera and to filter the image to identify a contour of the loaded material. The controller may be further configured to determine an area of the contour and to provide a signal to control the display device to indicate the determined area.

DETAILED DESCRIPTION

Figure 1:
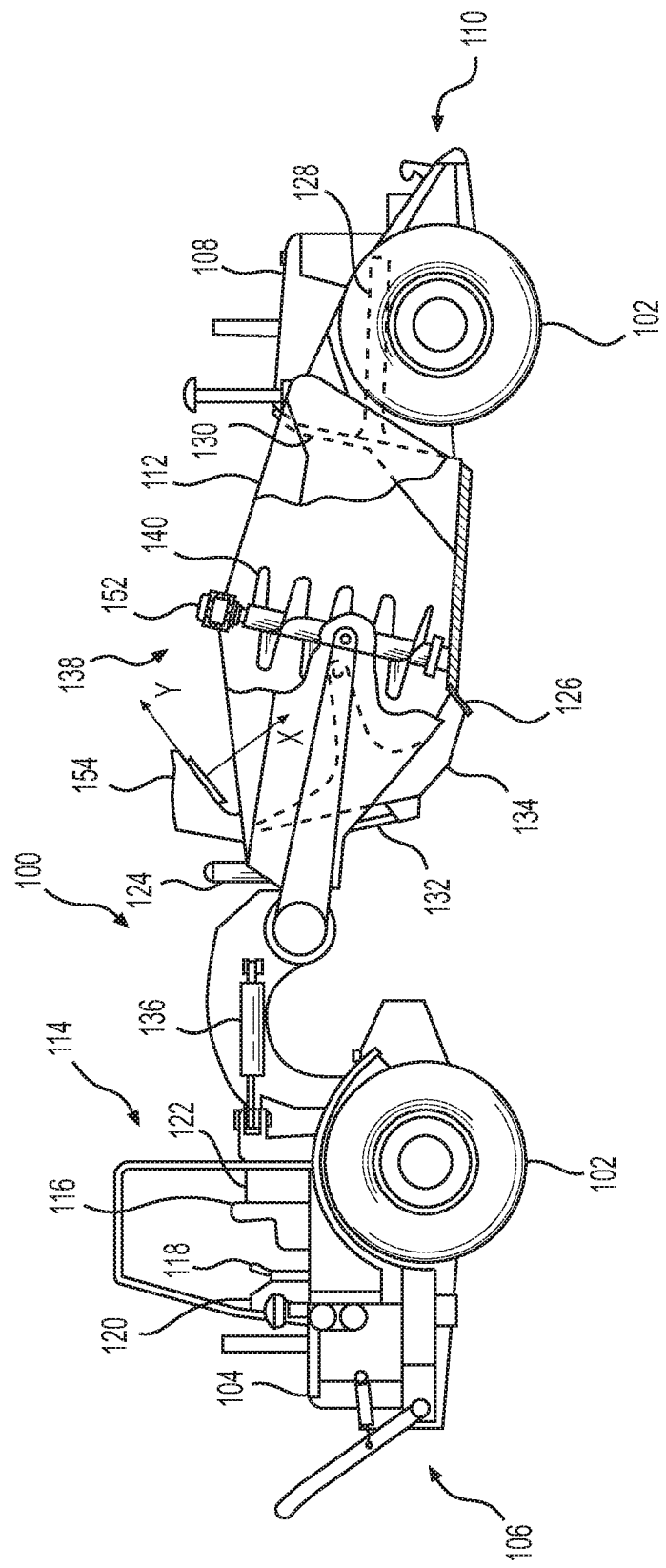
FIG. 1 is an illustration of a machine according to an exemplary disclosed embodiment.

FIG. 1 diagrammatically illustrates a machine 100 which may be, for example, a wheel tractor scraper. Machine 100 may be any machine for performing work on a site using a ground-engaging tool. Machine 100 may include various components or sub-machines such as wheel tractor scrapers, pull-pans, etc.

Machine 100 may include one or more traction devices 102, such as front and rear wheels, enabling machine 100 to function as a mobile unit. A suitable power source 104, e.g., a diesel combustion engine, may be located at the front 106 of machine 100. An additional power source 108, which also may be a diesel engine, may be included at the rear 110 of machine 100.

A payload carrier 112 between the front 106 and rear 110 of machine 100 may enable machine 100 to transport a quantity of material, such as earth (soil, rock, etc.). On a wheel tractor scraper, payload carrier 112 may be a container to receive and hold material for transport and may sometimes be called a scoop or bowl.

Machine 100 may further include an operator station 114. Operator station 114 may include an enclosed or partially-enclosed cab, and may include an operator seat 116, suitable operator control devices 118, a display device 120, and/or other components for operating machine 100.

Machine 100 also may include a suitable control system, including a controller 122, various detectors or sensors, and various actuators for operating the components of machine 100. For example, machine 100 may include one or more actuators 124, such as hydraulic cylinders, for raising and lowering payload carrier 112. Actuators 124 may lower payload carrier 112 so that a ground engaging tool 126, typically located at the lower front edge of payload carrier 112, may penetrate material to be loaded during a load phase of the machine 100. Actuators 124 may also raise payload carrier 112 for transportation of the payload during a haul phase of machine 100. Additional actuators may include one or more actuators 128 to move an ejector 130 during a dump phase and one or more actuators 132 for controlling an apron 134.

Actuators 132 may move apron 134 from engagement with the front portion of payload carrier 112 to an open position during load and dump phases. Actuators 132, by reverse movement, may also maintain apron 134 in a closed position engaged with the front portion of the payload carrier 112 during a haul phase.

Apron 134 may operate synchronously with ejector 130 during a dump phase, with actuators 132 moving apron 134 to the open position and actuators 128 moving ejector 130 within payload carrier 112 to assist in dumping the payload.

Steering of machine 100 may be facilitated by a steering unit including one or more actuators 136 located, for example, at a position between payload carrier 112 and the front 106 of machine 100.

As illustrated in FIG. 1, in some embodiments, a load assist unit 138 may optionally be associated with payload carrier 112. The exemplary load assist unit 138 shown in FIG. 1 is representative of various types of load assist units that may be employed, including, for example, auger units or elevator units. In FIG. 1, load assist unit 138 is illustrated as an auger 140. It will be understood that the load assist unit 138 may include a plurality of augers, an elevator unit, or other expedients which may assist the loading of material into payload carrier 112. Load assist unit 138 may be driven by a suitable machine actuator, e.g., a rotary hydraulic actuator 152.

Machine 100 may include other components to assist the operator in loading and dumping payload carrier 112 and/or to control machine 100 autonomously to do so. In the disclosed embodiments, a camera 154 may be positioned to view the interior of payload carrier 112 to enable determination of the amount of material accumulated in payload carrier 112. For example, camera 154 may be mounted on a portion of payload carrier 112, for example on a mast or stalk, to yield a view of the material entering the payload carrier and accumulated therein. In one embodiment, camera 154 may be a two-dimensional camera such as a category B (bridge digital) camera.

A machine 100 to which this disclosure applies, for example, a wheel tractor scraper, may operate in cycles that may include load, haul, dump, and return phases. In a given earth- or material-moving operation, such as that carried out by a wheel tractor scraper, machine cycles of operation may be affected by various parameters and/or factors which may be referred to as cycle characteristics. Consideration of cycle characteristics during machine operation may enable enhancement, optimization, and/or maximization of machine productivity, along with control of operation costs, through optimization of machine payload.

Cycle characteristics may include, for example, the length of the haul phase of a cycle, the grade to be negotiated by the machine, the character of the ground over which the machine must travel, the character of the machine (i.e., the machine size and manner of loading), the type of material loaded, and machine speed relative to the amount of payload.

Another cycle characteristic that may be considered in connection with a wheel tractor scraper is a load growth curve. A load growth curve is a graphic representation of the increase in payload volume during machine loading. For a wheel tractor scraper, the load growth curve normally may indicate that most of the payload volume is loaded early during the load phase of an operating cycle, with a gradually diminishing increase in payload later in the load phase.

Figure 2:
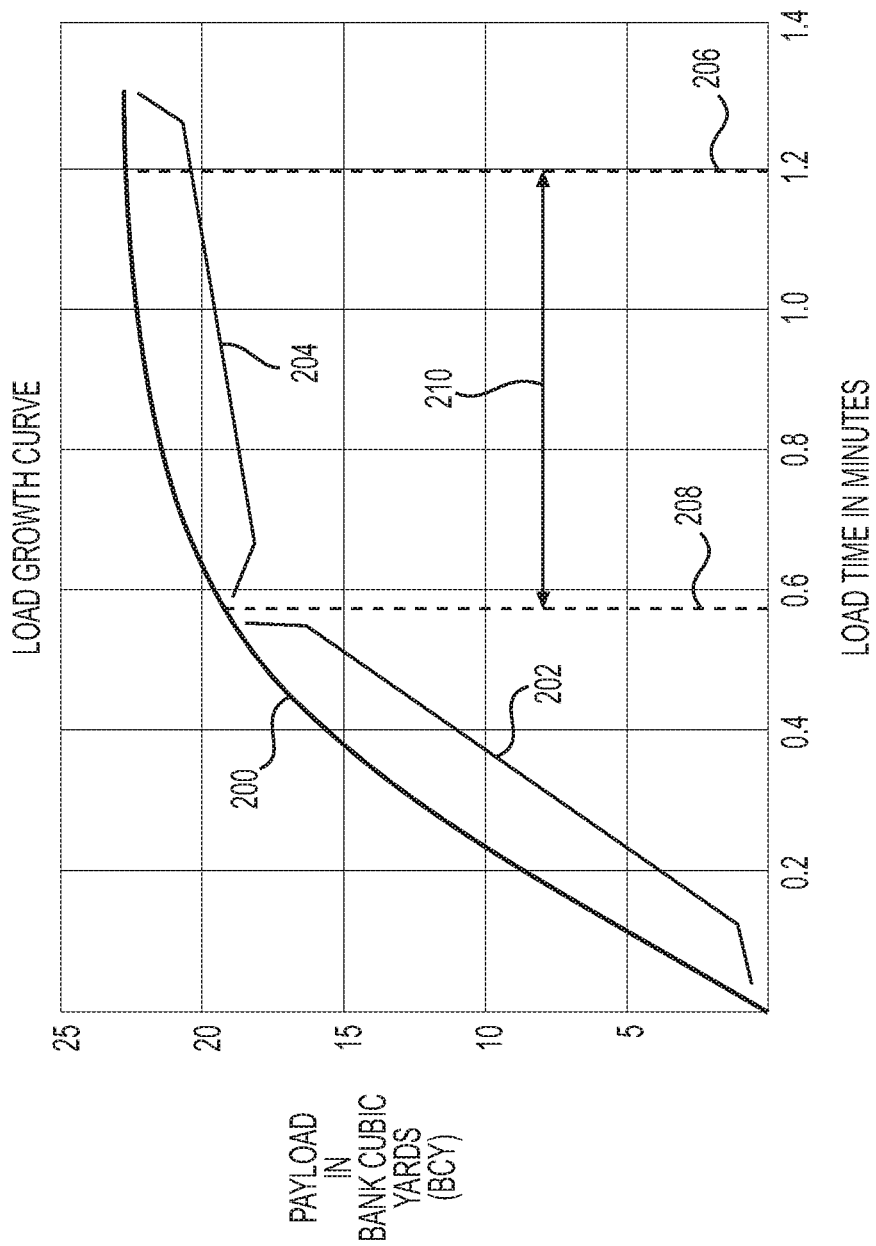
FIG. 2 is a graph of a load growth curve for the machine of FIG. 1.

FIG. 2 graphically illustrates an exemplary load growth curve 200 for a machine 100, such as a wheel tractor scraper. Payload is represented on the y-axis, and generally may be measured in bank cubic yards (BCY). Load time may be measured on the x-axis, with the unit of time in minutes and/or fractions thereof, for example.

Load growth curve 200 may exhibit a rather steep portion 202 during initial stages of loading and may level off, exhibiting a less steep portion 204, as the load phase proceeds. Thus, the bulk of payload volume may be accumulated in the part of the load phase corresponding to steep portion 202, with subsequent increase in payload gradually diminishing, corresponding to less steep portion 204. This characteristic shape for a load growth curve may be attributed to the fact that, as payload carrier 112 receives more and more material, later loaded material may be required to lift or force its way through previously loaded material.

As shown in FIG. 2, load growth curve 200 reflects an actual stop time 206 and an optimum stop time 208. Actual stop time 206—about 1.2 minutes in this example—may correspond to the time at which an operator in practice typically actually stops loading payload carrier 112 with material.

Optimum stop time 208—0.6 minutes in this case—may correspond to an optimum time at which loading should stop to maintain efficient and effective machine operation. Optimum stop time 208 may correspond to a point on load growth curve 200 at which steep portion 202 more sharply transitions to less steep portion 204. In the FIG. 2 example, optimum stop time 208 is about 0.6 minutes. Thus, in this example, an operator may typically continue loading for about 0.6 minutes after optimum stop time 208—half of the total loading time. While payload carrier 112 accumulated about 18 BCY in the first 0.6 minutes of loading, it only accumulated an additional 3 BCY during additional loading time 210 of 0.6 minutes from optimum stop time 208 to actual stop time 206. This makes additional loading time 210 an inefficient use of resources, including fuel and time.

It will be appreciated that machines like wheel tractor scrapers may have differing load growth curves, depending, for example, on the size of the machine, whether the machine is self-loading, whether the machine is push loaded, whether the machine is of the push-pull type, whether the machine has an expedient to augment loading (e.g., an elevator or auger), the type of material loaded (e.g., clay, sand, gravel, mixture of rock and earth, etc.), and/or the size and shape of payload carrier 112. The load growth curve for a given machine operating under a given set of circumstances may be determined empirically, in advance of actual production operation of the given machine. This may be accomplished by test operation and previous field experience, for example.

Controller 122 may include a central processing unit, a suitable memory component, various input/output peripherals, and other components typically associated with machine controllers. Controller 122 may include programs, algorithms, data maps, etc., associated with operation of machine 100. Controller 122 may be configured to receive information from multiple sources, such as, for example, one or more of the actuators 124, 128, 132, and 136, camera 154, various sensors or detectors (e.g., for machine travel direction, ground speed, engine operation, etc.), as well as input from a machine operator via, for example, control devices 118. Controller 122 may be suitably located to send and receive appropriate signals to and from the various sensors, actuators, etc., associated with machine 100. In one embodiment, as shown in FIG. 1, controller 122 may conveniently be located within or adjacent operator station 114. For example, controller 122 may comprise a laptop or mobile computer of the operator. Alternatively, controller 122 may comprise a dedicated electronic control module (ECM) or other type of onboard computer of machine 100. In some embodiments, aspects of controller 122 may be incorporated into camera 154 such that camera 154 is "smart camera" configured to perform the disclosed operations of controller 122. In this case, controller 122, or certain aspects thereof, may be eliminated.

Figure 3:
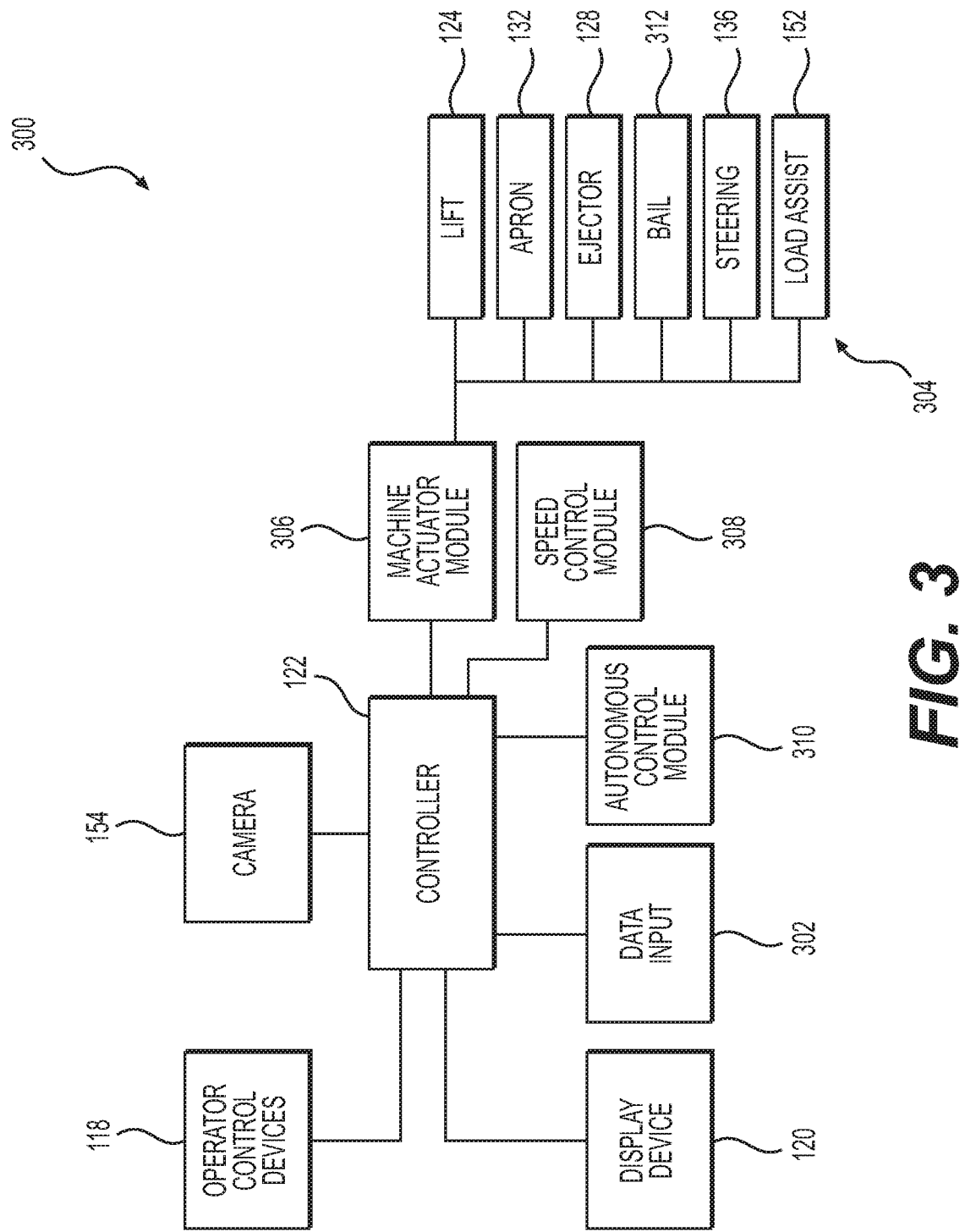
FIG. 3 is a schematic illustration of an exemplary control system of the machine of FIG. 1.

FIG. 3 schematically shows an exemplary control system 300 associated with controller 122. Controller 122 may suitably communicate with various machine components, for example via conductors. Operator control devices 118 and display device 120 may enable an operator to manually supply signals to controller 122. Display device 120 may, for example, provide an operator with various information to enhance operator awareness of various machine systems and thereby facilitate maintaining effective and efficient machine operation. Controller 122 may receive data input 302 from various sources, including keyboards, a touch screen display (which, for example, may be associated with display device 120), computer storage devices, Internet repositories, wireless networks, or other sources of data input known to those skilled in the art.

Controller 122 also may communicate with various machine actuators 304 via a machine actuator(s) module 306. Machine actuator module 306 may be configured to operate, for example, lift actuator(s) 124, apron actuator(s) 132, ejector actuators(s) 128, bail actuator, steering actuator(s) 136, load assist actuator(s) 152, or any other actuators associated with machine 100.

Controller 122 may further be configured to communicate with a speed control module 308 to control a mobile speed of machine 100. Speed control module 306 may include, for example, engine speed control expedients, throttle control, transmission gear shifting control, etc.

Controller 122 may further be configured to communicate with an autonomous control module 310. Autonomous control module 310 may control machine 100 to perform various tasks without any operator input, or with only a certain amount of operator input. For example, autonomous control module 310 may be configured to operate machine 100 in a loading mode for performing a loading phase at a certain loading location; a hauling mode for performing a hauling phase of hauling the loaded material from the loading location to a certain dumping location; a dumping mode for performing a dumping phase of dumping the material at the dumping location; and/or a return mode for returning machine 100 to the loading location. In response to signals from controller 122, autonomous control module 310 may control machine 100 to perform cycles of the loading, hauling, dumping, and return phases.

Controller 122 may receive input data relevant to cycle characteristics, for example, on an on-going basis. This may enable relatively continual updating of calculated optimum payloads for machine 100. For example, consistent with the disclosed embodiments, controller 122 may receive data from camera 154. In some embodiments, controller 122 may employ other components (not shown), such as an odometer, inclinometer, wheel slip sensors, another payload sensor (e.g., a scale), and/or various other sensors, detectors, diagnostic devices, etc. Controller 122 may use the data received from these components to gather data relevant to cycle characteristics and control the operations of machine 100.

Consistent with the disclosed embodiments, controller 122 may be configured to receive data from camera 154 indicating whether payload carrier 112 has been optimally filled with material in accordance with load growth curve 200. In response to this data, controller 122 may be configured to provide signals to one or more components of machine 100, such as operator control devices 118, display device 120, machine actuator module 306, speed control module 308, or autonomous control module 310.

For example, in response to receiving a signal from camera 154 indicating that payload carrier 112 is optimally filled, controller 122 may provide signal(s) to operator control devices 118. Controller 122 may provide signals to change a loading indicator light in operator station 114 from green (continue loading) to red (stop loading) to indicate to the operator that payload carrier 112 is optimally filled.

Alternatively, or additionally, controller 122 may be configured to provide signal(s) to display device 120 indicating that payload carrier 112 is optimally filled. Display device 120 may, in turn, may provide a visual indication on the display letting the operator know that payload carrier 112 is optimally filled.

Alternatively, or additionally, controller 122 may be configured to provide signal(s) to machine actuator module 306 indicating that payload carrier 112 is optimally filled. Machine actuator module 306, in turn, may provide signals to actuate one or more actuators. For example, machine 306 may provide one or more signals to: (1) lift actuator 124 to raise payload carrier 112; (2) apron actuator 132 to move apron 134 from an open position to a closed position engaged with the front portion of payload carrier 112; (3) ejector actuator 128 to move ejector 130 within payload carrier 112, such as to dump the payload or stow ejector 130 for the hauling phase; (4) a bail actuator 312 to manipulate a bail at the front 106 of machine 100; (5) steering actuator 136 to change the angle between the front 106 and rear 110 sections of machine 100; or (6) load assist actuator 152 to stow a load assist unit for the haul phase.

Alternatively, or additionally, controller 122 may be configured to provide signal(s) to speed control module 308 indicating that payload carrier 112 is optimally filled. In response to the signal(s), speed control module 308 may be configured to reduce the speed of machine 100 or stop machine 100, to reduce throttle or the speed of power source(s) 104, 108, etc.

Alternatively, or additionally, controller 122 may be configured to provide signal(s) to autonomous control module 310 indicating that payload carrier 112 is optimally filled. In response to the signal(s), autonomous control module 310 may, for example, change the current operating mode of machine 100 from the loading mode to the haul mode or perform other functions to complete the loading phase.

Figure 4:
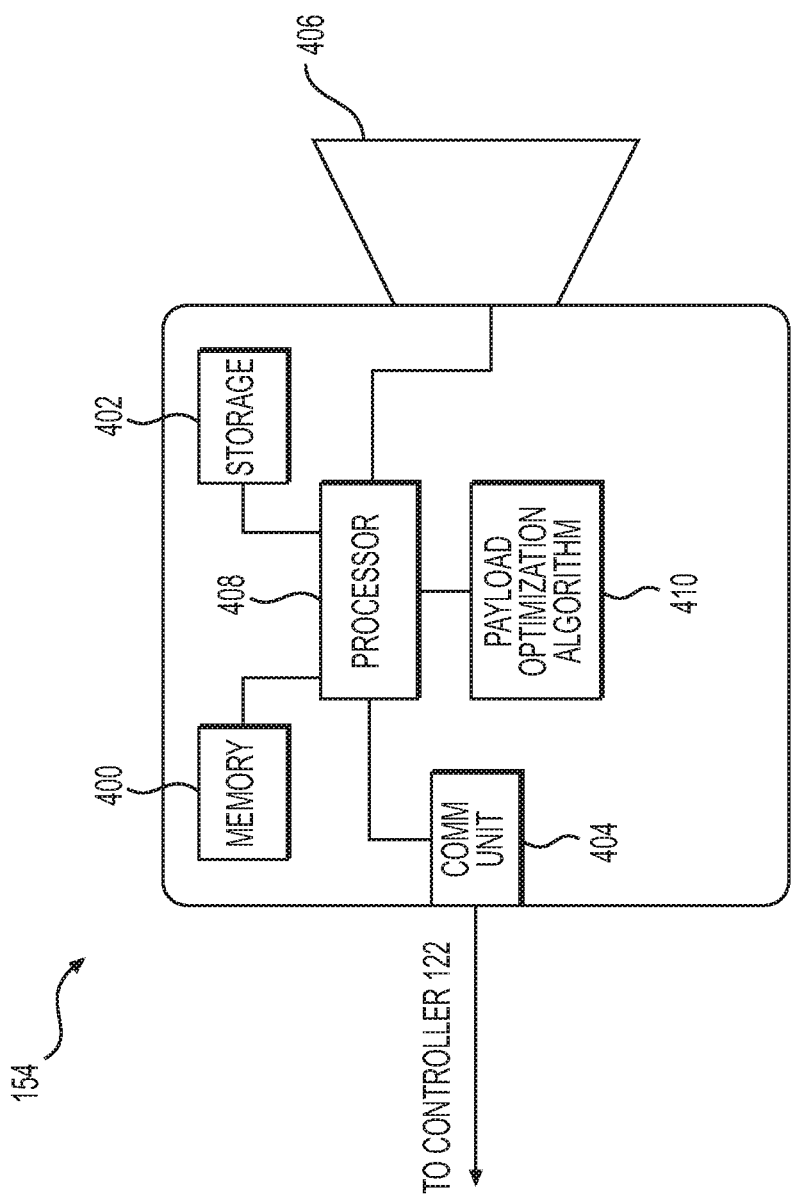
FIG. 4 is a schematic illustration of an exemplary camera associated with the control system of FIG. 3.

FIG. 4 shows an exemplary schematic representation of camera 154. Camera 154 may have computing components for digital cameras. For example, camera 154 may have memory 400, data storage 402, a communication unit 404, a lens unit 406, a processor 408 configured to execute a payload optimization algorithm 410.

Memory 400 may include temporary data storage such as RAM. Data storage 402 may include persistent storage such as ROM, Flash, solid state, or other type of data storage known in the art.

Communication unit 404 may be configured to communicate with external components, such as controller 122. Communication unit 404 may include example, USB, Firewire, Bluetooth, Wi-Fi, CAN bus, Ethernet or other electronic communication interfaces known in the art for interconnecting computing devices. Under the command of processor 408, communication unit 404 may intermittently or continually send data signals to controller, including signals indicating whether payload carrier 112 has been determined to be optimally loaded. In some embodiments, communication unit 404 may also stream live video data to controller 122 for display or processing.

Consistent with the disclosed embodiments, lens unit 406 may comprise any two-dimensional lens system known in the art for digital cameras. For example, lens unit 406 may embody a digital single-lens reflex (DSLR) system including a lens (e.g., 35 mm lens) and a two-dimensional image sensor, such as CCD or CMOS image sensor. It is to be appreciated that lens unit 406 may be the same type of lens unit used in conventional digital cameras or smartphones.

Lens unit 406 may output to processor 408 images in the form of a continuous or intermittent data stream containing color values for each pixel of the two-dimensional image sensor (e.g., a color filter array). Thus, the data stream may contain two-dimensional image information. Camera 154 may be positioned so that lens unit 406 views the interior of payload carrier 112 without obstruction and the output data stream thus contains two-dimensional image information for the interior of payload carrier 112.

Processor 408 may be an image processor known in the art for digital cameras. For example, processor 408 may be a digital signal processor (DSP) configured to perform various types of imaging processing, such as Bayer transformation, demosaicing, noise reduction, imaging sharpening, edge-detection, or coordinate system transformation.

Payload optimization algorithm 410 may comprise computer program instructions installed on processor 408 and/or stored in memory 400 or storage 402 for execution by processor 408. Payload optimization algorithm 410, executed by processor 408, may be configured to process the two-dimensional digital image data received from lens unit 406 to determine when payload carrier 112 is optimally loaded. To do so, algorithm 410 may transform the two-dimensional data received from lens unit 406 from a first coordinate system associated with camera 154 to a second, reference coordinate system used to determine the amount of material in payload carrier 112.

Figure 5:
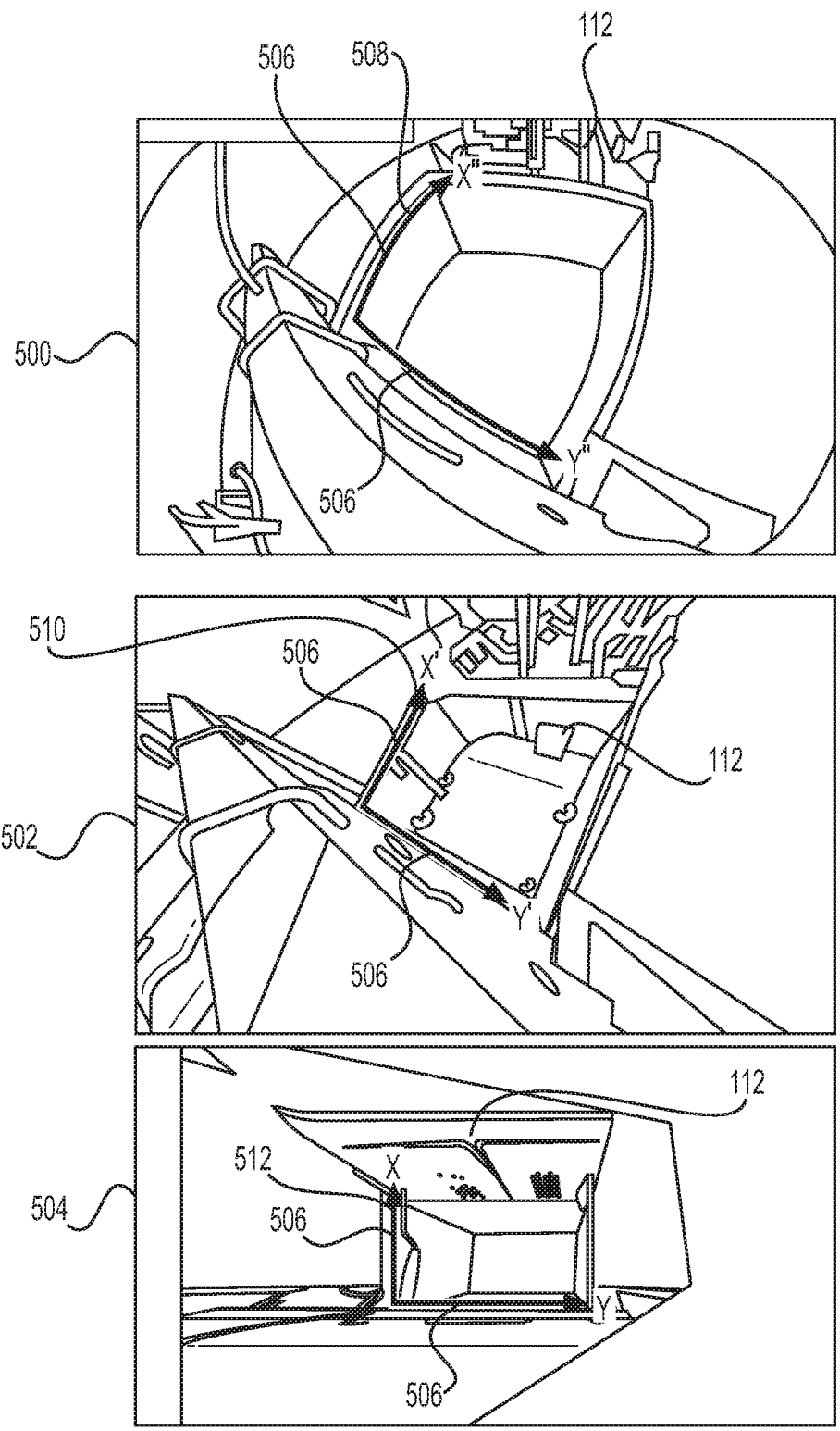
FIGS. 5 and 6 are representations of images captured by the camera of FIG. 4.

FIG. 5 shows a sequence of images 500-504 illustrating how algorithm 410 may transform the two-dimensional image data from lens unit 406. It will be appreciated that camera 154 may need to be placed so that it does not interfere with operations of machine 100 yet still has a view of the interior of payload carrier 112. For example, payload carrier 112 may have a generally rectangular shape, and camera 154 may sit on a mast at the rear right of payload carrier 112. Thus, camera 154 may have a view from diagonally across and above payload carrier 112. Accordingly, camera 154 may produce an image 500 of payload carrier 112 similar that shown in FIG. 5.

Additionally, in some embodiments, camera 154 may have a fisheye lens or other wide-angle lens to capture the entire payload carrier 112 from a close position. Thus, in image 500 generated by camera 154, top edges 506 of payload carrier 112 may define axes of a coordinate system 508 (X", Y") distorted relative to reality. For example, coordinate system 508 may bulge outward from "barrel" distortion induced by a wide-angle lens. It will be appreciated that the pixel locations (X", Y") of image 500 inside coordinate system 508 may thus be visually distorted relative to reality.

Using image distortion correction techniques and the specifications of camera 154, algorithm 410 may be configured to correct image 500 to remove the distortion, producing undistorted image 502. For example, before mounting camera 154 to machine 100, camera 154 may be calibrated using an open-source "checkerboard" technique that outputs calibration parameters required to produce rectangular checkerboard of a predetermined size from the distorted image 500. Algorithm 410 may be configured to apply the calibration parameters to image 500 to produce image 502.

In undistorted image 502, top edges 506 of payload carrier 112 may define an undistorted coordinate system 510 (X', Y') in which the X'- and Y'-axes extend in straight lines. Algorithm 410 may be configured to translate the pixel locations (X", Y") in coordinate system 508 to their corresponding locations (X', Y') in coordinate system 510.

As can be seen in FIG. 5, in image 510, payload carrier 112 appears rotated about 45 degrees relative to horizontal. Additionally, because the view from image 502 remains from diagonally across and above payload carrier 112, the X' and Y' axes intersect one another at an obtuse angle (i.e., greater than 90 degrees).

To produce an image 504 by which the amount of material in payload carrier 112 may be determined, algorithm 410 may be configured to rotate and translate the pixel locations (X', Y') in coordinate system 510 to corresponding locations (X, Y) in a working coordinate system 512. In coordinate system 512, the X- and Y-axes intersect one another at a right angle (i.e., 90 degrees) as in a standard cartesian coordinate system. To accomplish this, algorithm 410 may use rotational and translational transformation techniques. For example, algorithm 410 may be configured to apply perspective transformation (e.g., an OpenCV algorithm) so that the corners of payload carrier 402 form a rectangle, transforming image 502 to top-down image 504. Image 504 may correspond to a top-down view of payload carrier 112 from vertically above it, i.e., looking straight down at payload carrier 112 from above.

Figure 6:
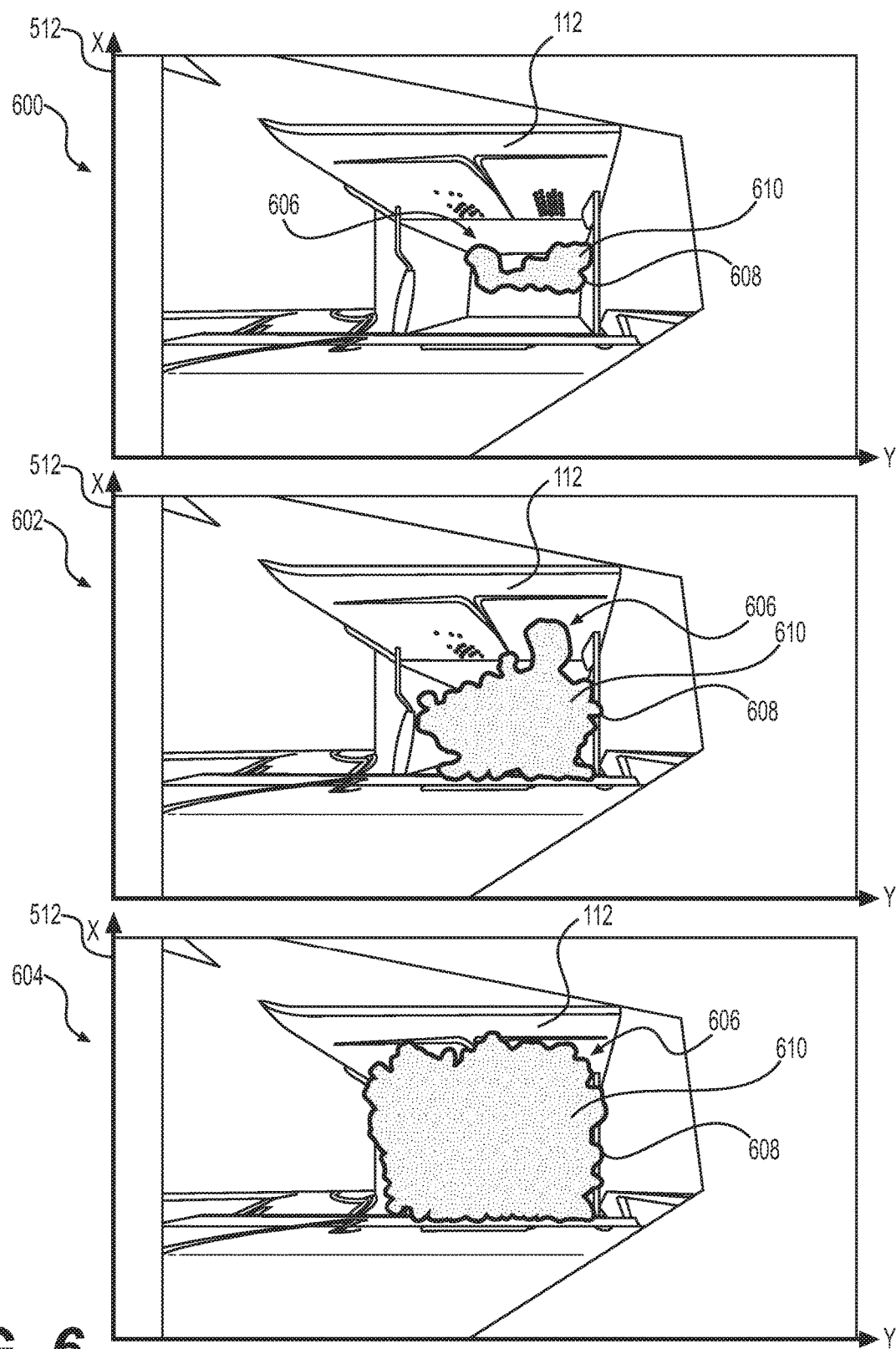

FIG. 6 shows sequential images 600-604 of payload carrier 112 as it may be filled with material during loading, from the top-down perspective of image 504. In image 600, loading of payload carrier 112 has just begun, so payload carrier 112 may only contain a small amount of material 606. Material 606 may define a contour 608, around its edges or perimeter, enclosing an area 610. It will be appreciated that area 610 may be a vertical cross-sectional area of material 606 as it sits in payload carrier 112 (i.e., the area of the "footprint" of material 606) because of the top-down perspective of image 504.

As payload carrier 112 fills further with material 606, contour 608 may expand, enclosing a larger and larger area 610. Image 602 shows payload carrier 112 when partially filled (e.g., 50%) with material 606, and image 604 shows payload carrier 112 when optimally filled (e.g., 85%) with material 606. In this description, "optimally" filled may refer to a payload volume corresponding to a desired optimum stop time 208 on load growth curve 200, at which steep portion 202 transitions to less steep portion 204.

The optimum volume and corresponding desired optimum stop time 208 may be determined in different ways. For example, they may be determined empirically through field testing of machine 100. Alternatively, an operator or other person knowledgeable about the performance characteristics of machine 100 may select the optimum volume/stop time 208 based on experience. The optimum volume/stop time 208 may also be determined mathematically by selecting a point on load growth curve 200 at which the slope of load growth curve 200 reaches a certain desired threshold (e.g., 30%).

The area 610 of material 606 may correspond generally to the actual volume of material 606 in payload carrier 112. For example, certain materials are known to rest at certain angles of repose. Thus, if material 606 has a certain area 610, material 606 may have certain corresponding height. Likewise, as area 610 expands by a known amount, it may be assumed that the height of material 606 also grows by a corresponding known amount. This may allow a relative volume of the material to be calculated based on the cross-sectional area 610. Additionally, an actual value for the volume of the material may be computed from the relative volume based on the known dimensions of payload carrier 112. Accordingly, in the disclosed embodiments, area 610 of material 608 in payload carrier 112 may be used as a substitute or surrogate for volume.

In the examples shown in FIG. 6, it may be assumed that the area 610 of material 606 shown in image 504 corresponds to the optimum loading volume for payload carrier 112 (e.g., 85%) based on load growth curve 200. Thus, based on the above discussion, it may be desirable to stop loading payload carrier 112 when area 610 reaches the threshold area shown in image 504.

Algorithm 410 may be configured to calculate area 610 encompassed by contour 608 using imaging processing techniques. In one embodiment, algorithm 410 may be configured to apply a feature-detection algorithm (e.g., an OpenCV algorithm), which may output pixel values (X, Y) of features in image 504. For example, sharp angles (e.g., >60 degrees) may be identified as features, such as the corners of payload carrier 112 or the corners of material 606.

Algorithm 410 may be configured to then filter/remove the coordinates (X, Y) corresponding to features other than material 606. In one embodiment, algorithm 410 may be configured to use motion detection. For example, algorithm 410 may apply the Lucas-Kanade Optical flow technique as implemented in OpenCV, using as input the pixel values (X, Y) of the detected features, the current image 504, and the previous image 504. As output, algorithm 410 may be configured to provide motion vectors for the pixel values (X, Y) corresponding each of detected features containing. The motion vectors may include the magnitude of the motion and the direction of the motion of the features between the two images 504.

Algorithm 410 may be configured to remove the pixel values (X, Y) corresponding to features with motion vectors whose magnitudes are above a threshold. For example, algorithm 410 may be configured to determine the mean magnitude of the motion vectors and the standard deviation of the motion vectors. Algorithm 410 may then remove the features with pixel values (X, Y) having motion vectors with a magnitude greater than the mean by a certain threshold, such as two standard deviations. As explained below, following this process, only the coordinates (X, Y) corresponding to material 606 may remain.

Algorithm 410 may be configured to determine area 610 of contour 608. For example, algorithm 410 may be configured to count the number of pixels remaining following the filtering, which is area 610 as measured in square pixels. Algorithm 410 may also be configured to determine a percentage fill factor for the payload carrier 112. The area of payload carrier 112 may be the total number of pixels within the four corners of payload carrier 112, which may be determined in advance and/or fixed. To determine the percentage fill factor, algorithm 410 may be configured to divide the counted number of pixels within contour 608 by the total number of pixels within the four corners of payload carrier 112.

Algorithm 410 may be configured to use other techniques to determine area 610 of contour 608, if desired. For example, algorithm 410 may apply edge detection to identify the pixel values (X, Y) corresponding to contour 608. In one embodiment, algorithm 410 may be configured to identify pixels in image 504 where the color values transition from the color of material 606 (e.g., brown, black, or dark gray in a grayscale image) to the color of payload carrier 200 (e.g., yellow or light gray in a grayscale image). Algorithm 410 may deem these identified pixels as contour 608. Next, algorithm 410 may be configured to identify all pixels in image 504 that fall within contour 608. Algorithm 410 may be configured to count the total number of pixels making up contour 608 and within the region encompassed by contour 608. Algorithm 410 may be determined to determine a percentage fill factor by dividing the total number of pixels of contour 608 by the total number of pixels inside the four corners of payload carrier 112.

Figure 7:
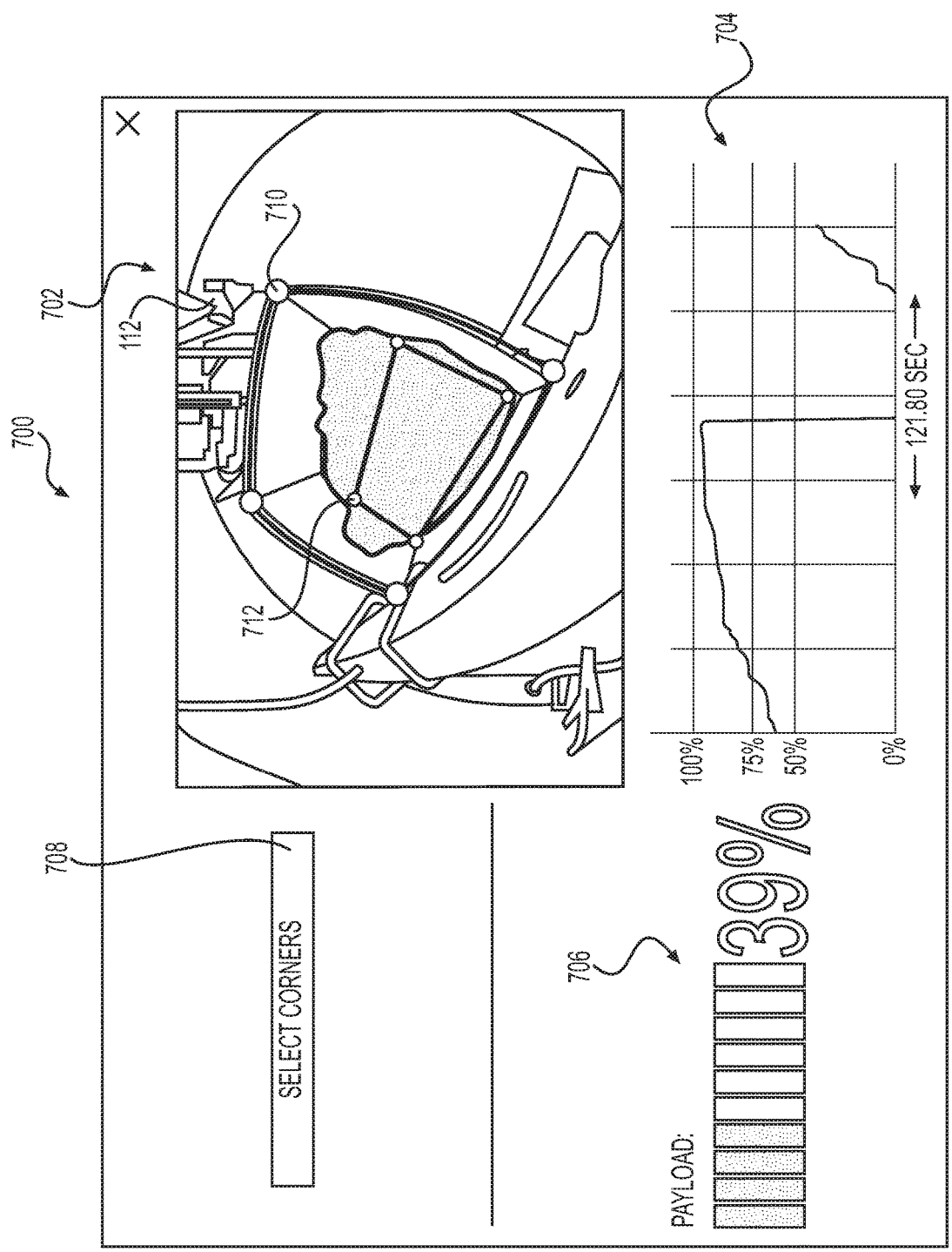
FIG. 7 is a representation of an exemplary interface displayed on a display device of the machine.

As shown in FIG. 7, algorithm 410 may be configured to provide signals to controller 122 to control display device 120 to display a payload carrier status interface 700. Interface 700 may have one or more user interface elements allowing the operator to provide or control information about the status of payload carrier 112. For example, interface 700 may include a video feed window 702 displaying a live video feed from camera 154, corresponding to image 500. Interface 700 may further include a payload growth curve 704 illustrating the current loading status of payload carrier 112.

Interface 700 may further have a fill factor indicator 706 indicating the percentage fill factor of payload carrier 112, i.e., the percentage of payload carrier 112 that is filled with material 606. Interface 700 may also be configured to provide a notification that payload carrier 112 is optimally filled upon receiving a corresponding signal from camera 154. For example, interface 700 may be configured to display a "Stop Loading" message upon receipt of such a signal so that the operator knows to stop the current loading phase.

Interface 700 may further include an option 708 to set the top corners 710 and bottom corners 712 of payload carrier 112. For example, upon selecting option 708, the operator or a technician may use a mouse, a touch screen of display device 120, or other user input device to set the corners 710, 712. Once set, algorithm 410 may be configured to use corners 710, 712 to translate image 500 to image 502, as explained above.

Figure 8:
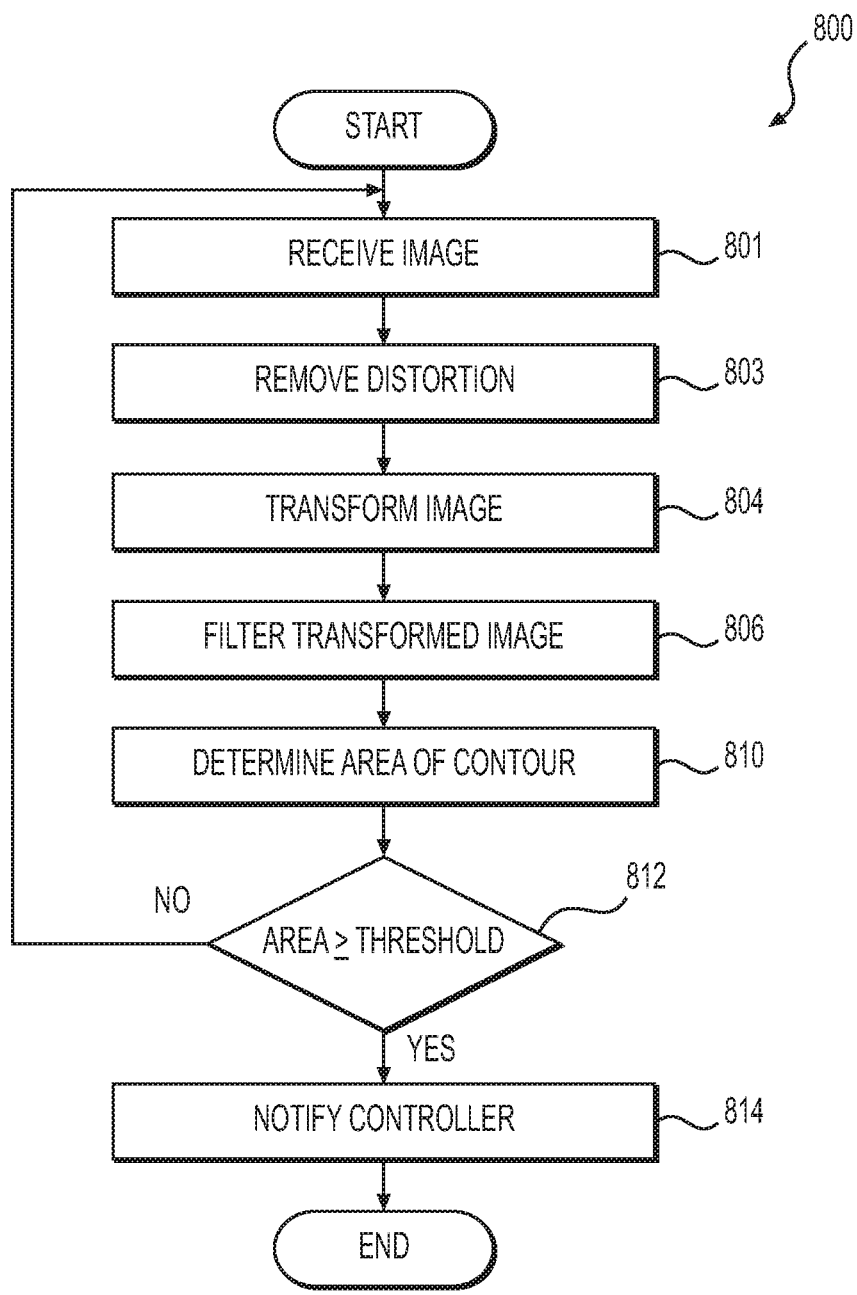
FIG. 8 is a flowchart of an exemplary method for optimizing loading of the machine's payload carrier.

FIG. 8 shows an exemplary method 800 for optimizing loading of payload carrier 112 during operation of machine. Method 800 may be performed by algorithm 410 when executed by processor 408. The steps of method 800 need not necessarily be performed in the order shown in FIG. 8 and may be performed in different orders consistent with the disclosed embodiments.

In step 802, algorithm 410 may receive a live video feed corresponding to image 500 from lens unit 406. The video feed may be displayed in window 702 of interface 700.

In step 803, algorithm 410 may remove distortion from an image 500 in the feed as explained above. For example, in an embodiment using a wide-angle lens, algorithm 410 may remove barrel distortion. Thus, for example, step 803 may convert pixel values (X", Y") in coordinate system 508 to corresponding pixel values (X', Y') in coordinate system 510.

In step 804, algorithm 410 may transform image 500 from coordinate system 510 to coordinate system 512 of image 504, as discussed above with respect to FIG. 5. For example, previously the operator may have used option 708 to select top corners 710 and bottom corners 712 of payload carrier 112. Algorithm 410 may use the pixel values (X', Y') for corners 710 and/or 712 of payload carrier 112 to translate all pixel values (X', Y') in coordinate system 510 to their corresponding values (X, Y) in coordinate system 512, as explained.

Figure 9:
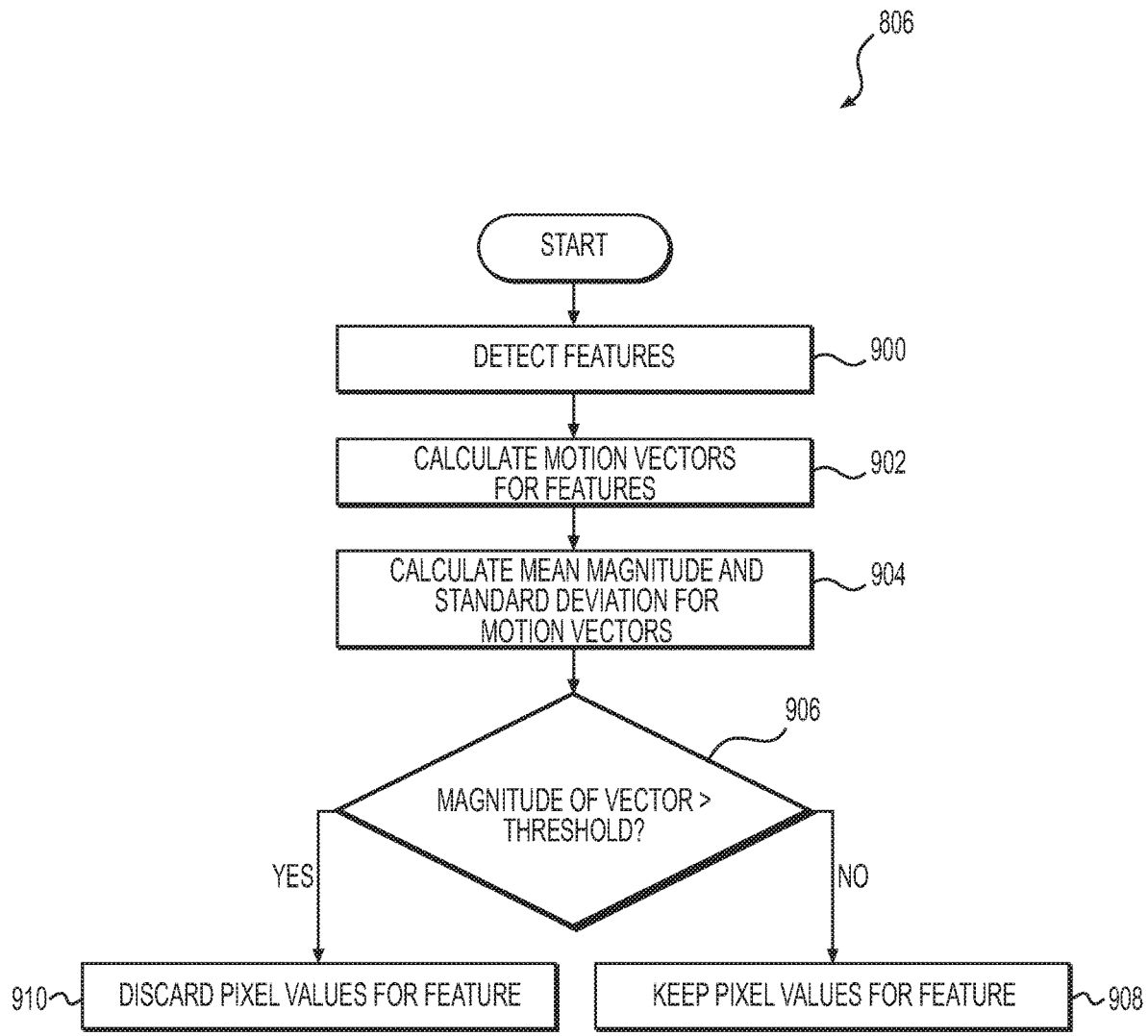
FIG. 9 is a flowchart of an exemplary filtering step of the method of FIG. 8.

In step 806, algorithm 410 may filter the transformed image 504 to remove pixel values corresponding to features other than material 606, as explained above. FIG. 9 shows a method for an exemplary step 806.

In step 900, algorithm 410 may detect features in image 504. For example, as explained above, algorithm 410 may apply a feature-detection process (e.g., an OpenCV process). The feature-detection process may output pixel values (X, Y) of any identified features in image 504, such as the corners of payload carrier 112 and the edges or corners of material 606 in payload carrier 112.

In step 902, algorithm 410 may calculate motion vectors for the features identified in step 900. For example, as explained above, algorithm 410 may apply a motion-detection technique such as the Lucas-Kanade Optical flow technique. Using the input the pixel values (X, Y) of the features detected in step 900, a prior image 504, and the current image 504 as input, algorithm 410 may calculate motion vectors for each of the detected features. Each motion vector may have a value for a magnitude of the feature's motion between the prior image 504 and the current image 504. Additionally, in some embodiments, each vector may have a value for the direction of the motion between the prior image 504 and the current image 504. For example, a motion vector for a given feature may be 10 pixels, 45 degrees.

In step 904, algorithm 410 may calculate a mean magnitude of the motion vectors calculated in step 902 (e.g., in pixels). Algorithm 410 may additional calculate a standard deviation of the magnitudes (e.g., in pixels).

In step 906, algorithm 410 may determine whether the magnitude of each vector calculated in step 902 is greater than a threshold (e.g., 12 pixels). In one embodiment, the threshold may be the mean magnitude calculated in step 904 plus a certain number X of standard deviations. This is because X=2 standard deviations may provide a threshold distinguishing features corresponding to material 606 from other moving features. For example, pixel values (X, Y) corresponding to material 606 may move by certain magnitudes, from one image 504 to the next, as payload carrier 112 fills with material 606 and contour 608 expands. Thus, the threshold may be selected so that the various magnitudes by which material 606 typically moves between images 504 fall within the threshold. In the X=2 example above, features with motion vectors whose magnitudes are less than or equal to the mean magnitude plus two standard deviations may be known to correspond to moving or stationary material 606. On the other hand, features whose motion vectors have magnitudes greater than the mean magnitude by more than two standard deviations may be known to be moving too quickly to be material 606. They may be, for example, the surrounding environment, shadows, momentary obstructions to the view of camera 154, or other features that are not material 606.

If the result of step 906 is no, the pixel values corresponding to the features have been determined to correspond to material 606. Thus, in step 908, the pixel values may be kept for the area calculation. For example, algorithm 410 may store those pixel values in memory 400 of camera 154 for further processing.

If the result of step 906 is yes, the pixel values corresponding to the features have been determined not to correspond to material 606. Thus, in step 910, the pixel values may be discarded and not used in the area calculation.

Returning to FIG. 8, in step 808, algorithm 410 may determine area 610 of contour 608. For example, algorithm 410 may count the number of pixels kept in step 908 and thus remaining after the filtering of FIG. 9. This number of pixels may correspond to area 610, in square pixels. Additionally, algorithm 410 may determine the percentage fill factor by dividing the number of counted pixels by the total number of pixels within the four corners of payload carrier 112 in image 504, which may be determined in advance and/or fixed. Algorithm 410 may provide signal(s) to controller 122 so that controller 122 controls display device 120 to indicate the calculated fill factor on indicator 706 within interface 700.

In step 810, algorithm 410 may determine whether the area 610 determined in step 808 is equal to or greater than a threshold. For example, algorithm 410 may determine whether the fill factor determined in step 808 is greater than or equal to a threshold percentage (e.g., 85%). As discussed above, the threshold percentage may be predetermined to correspond to a desired optimum loading volume of payload carrier 112 (e.g., 85%) relative to the total loading capacity.

If the result of step 810 is "no," algorithm 410 may return to step 802, and algorithm may repeat steps 802-812 until area 610 reaches the threshold, meaning that payload carrier 112 has been loaded to the optimum volume.

If the result of step 810 is "yes," algorithm 410 may notify controller 122 that payload carrier 122 has been determined to be optimally loaded, in step 812. For example, as discussed above, processor 408 may transmit a signal via communication unit 404 to controller 122 indicating that payload carrier 122 has been optimally loaded.

As explained above, controller 122 may take one or more actions based on this notification, including any combination of, for example:

Provide signals to change a loading indicator light in operator station 114 from green (continue loading) to red (stop loading) so the operator knows payload carrier 112 is optimally filled. The operator may then manually control machine 100 to stop loading payload carrier.

Provide signal(s) to display device 120 indicating that payload carrier 112 is optimally filled. Display device 120 may, in turn, may provide a visual indication on the display (e.g., a "Stop Loading" message) letting the operator know that payload carrier 112 is optimally filled. The operator may then manually control machine 100 to stop loading payload carrier.

Provide signal(s) to machine actuator module 306 indicating that payload carrier 112 is optimally filled. Machine actuator module 306, in turn, may provide signals to actuate actuators to complete the loading phase. For example, machine 306 may provide one or more signals to: (1) lift actuator 124 to raise payload carrier 112; (2) apron actuator 132 to move apron 134 from an open position to a closed position engaged with the front portion of payload carrier 112; (3) ejector actuator 128 to move ejector 130 within payload carrier 112, such as to dump the payload or stow ejector 130 for the hauling phase; (4) a bail actuator 312 to manipulate a bail at the front 106 of machine 100; (5) steering actuator 136 to change the angle between the front 106 and rear 110 sections of machine 100; or (6) load assist actuator 152 to stow a load assist unit for the haul phase.

Provide signal(s) to speed control module 308 indicating that payload carrier 112 is optimally filled. In response to the signal(s), speed control module 308 may be configured to bring the loading phase to an end by reducing the speed of machine 100, stopping machine 100, reducing the throttle or the speed of power source(s) 104, 108, etc.

Provide signal(s) to autonomous control module 310 indicating that payload carrier 112 is optimally filled. In response to the signal(s), autonomous control module 310 may, for example, change the current operating mode of machine 100 from the loading mode to the haul mode or perform other functions to complete the loading phase.

INDUSTRIAL APPLICABILITY

The disclosed embodiments may apply to work machines, such as, for example, wheel tractor scrapers, which may operate in cycles that may include load, haul, dump, and return phases. It is beneficial to complete these cycles as efficiently as possible by eliminating wasted time and resources such as person-hours and fuel. Efficiency may be increased by accounting for cycle characteristics—one of which is the load growth curve of the machine discussed herein.

Specifically, time and resources may be saved by accounting for load growth curve 200 for machine 100. By ensuring that, for each load cycle, operators do not continue loading payload carrier 112 beyond the optimum volume, more cycles may be completed in less time using less fuel.

The disclosed embodiments may provide a relatively inexpensive but effective technique to notify the operator to stop loading—or to autonomously control machine 100 to do so—once the optimum fill volume is reached. While payload volume can be determined with three-dimensional imaging systems such as LiDAR or stereo cameras, such systems are expensive. Thus, it may be cost-prohibitive to use three-dimensional payload imaging systems, for example, on a fleet of machines.

By contrast, the disclosed embodiments may instead apply an inexpensive two-dimensional camera 154, such as the types used on conventional, mass-produced smartphones or digital cameras. Volume may not be directly calculated from a two-dimensional image, but the disclosed embodiments may use an area 610 of the payload material 606 as a surrogate to indirectly determine when the optimum payload volume has been reached. This advantageously allows the use of relatively inexpensive two-dimensional cameras instead of more expensive three-dimensional cameras. Additionally, two-dimensional image processing typically may require fewer computing resources than three-dimensional image processing. Thus, the disclosed embodiments may reduce cost by requiring fewer computing resources.

Additionally, the disclosed embodiments may enable the operator to better focus on safely driving the machine. By providing a notification (e.g., indicator light or indication on the display) when the payload carrier is optimally filled, the operator may not need to turn around to view the payload carrier to determine whether it is full, as in the case of conventional wheel tractor scrapers.

It will be apparent to those skilled in the art that various modifications and variations can be made to the disclosed payload overload control system without departing from the scope of the disclosure. Other embodiments will be apparent to those skilled in the art from consideration of the specification and practice of the embodiments disclosed herein. For example, this disclosure may describe embodiments in which camera 154 is "smart" and configured to perform algorithm 410. This may allow camera 154 to be offered as a standalone unit (e.g., kit) for retrofitting an older machine that does not otherwise have the disclosed payload optimization functionality. However, machines may also be equipped with this functionality as a standard or optional feature. For example, this disclosure also includes using an ordinary camera instead of a "smart" camera. In such embodiments, one or more of the functions of camera 154, including one or more functions of algorithm 410, may be embedded in controller 122 instead of the camera, and the camera need only capture the images of the payload carrier and provide them to the controller. Thus, it is intended that the specification and examples be considered as exemplary only, with a true scope of the disclosure being indicated by the following claims and equivalents thereof

What is claimed is:

1. A method for loading of a payload carrier of a machine, the method comprising:
    receiving, from a camera on the machine, a two-dimensional image of an interior of the payload carrier as material is loaded into the payload carrier;
    filtering the image to identify a contour of the loaded material;
    determining an area of the contour of the loaded material;
    determining that the area is equal to or greater than to a threshold;
    based at least in part on determining that the area is equal to or greater than the threshold, performing one or more of the following:
        controlling a display device in an operator station of the machine to indicate that the payload carrier of the machine is full;
        activating an indicator light in the operator station to indicate to stop loading the payload carrier;

providing a visual indication on the display device to indicate to stop loading the payload carrier;
controlling the machine to raise the payload carrier from a ground surface;
controlling the machine to move an apron of the payload carrier from an open position to a closed position to prevent further loading of the payload carrier;
controlling the machine to reduce speed or to stop; and
controlling the machine to change a current operating mode of the machine to an autonomous haul mode.

2. The method of claim 1, wherein the threshold is a percentage of a total area of the payload carrier.

3. The method of claim 1, wherein determining an area includes counting a number of pixels within the contour.

4. The method of claim 1, wherein filtering the image includes:
identifying pixels corresponding to features in the image;
calculating motion vectors for the identified pixels; and
removing pixels corresponding to motion vectors having a magnitude greater than a threshold.

5. The method of claim 1, further comprising removing, from the image, distortion caused by a wide-angle lens before determining the area.

6. A camera for assisting loading of a payload carrier of a machine, the camera comprising:
a memory storing instructions; and
a processor configured to execute the instructions to:
receive a two-dimensional image of an interior of the payload carrier as material is loaded into the payload carrier;
filter the image to identify a contour of the loaded material;
determine an area of the contour;
determine that the area is equal to or greater than to a threshold; and
based at least in part on determining that the area is equal to or greater than the threshold, provide a signal to a controller associated with the machine, the signal causing performance of one or more of the following:
control a display device in an operator station of the machine to indicate that the payload carrier is full;
activate an indicator light in the operator station to indicate to stop loading the payload carrier;
provide a visual indication on the display device to indicate to stop loading the payload carrier;
control the machine to raise the payload carrier from a ground surface;
control the machine to move an apron of the payload carrier from an open position to a closed position to prevent further loading of the payload carrier;
control the machine to reduce speed or to stop; and
control the machine to change a current operating mode of the machine to an autonomous haul mode.

7. The camera of claim 6, wherein the threshold is a percentage of a total area of the payload carrier.

8. The camera of claim 6, wherein to determine an area of the contour, the one or more processors are further configured to execute the instructions to count a number of pixels within the contour.

9. The camera of claim 6, wherein to filter the image, the one or more processors are further configured to execute the instructions to:
identify pixels corresponding to features in the image;
calculate motion vectors for the identified pixels; and
remove pixels corresponding to motion vectors having a magnitude greater than a threshold.

10. The camera of claim 6, wherein the one or more processors are further configured to execute the instructions to remove, from the image, distortion caused by a wide-angle lens before determining the area.

11. A machine, comprising:
a display device;
a camera configured to capture a two-dimensional image of an interior of a payload carrier of the machine when material is loaded into the payload carrier; and
a controller configured to:
receive the image from the camera;
filter the image to identify a contour of the loaded material;
determine an area of the contour;
determine that the area is equal to or greater than to a threshold; and
in response to determining that the area is equal to or greater than the threshold, provide a signal causing performance of one or more of the following:
control the display device to indicate that the payload carrier is full;
activate an indicator light in an operator station of the machine to indicate to stop loading the payload carrier;
provide a visual indication on the display device to indicate to stop loading the payload carrier;
control the machine to raise the payload carrier from a ground surface:
control the machine to move an apron of the payload carrier from an open position to a closed position to prevent further loading of the payload carrier;
control the machine to reduce speed or to stop; and
control the machine to change a current operating mode of the machine to an autonomous haul mode.

12. The machine of claim 11, wherein the threshold is a percentage of a total area of the payload carrier.

13. The machine of claim 11, wherein the machine is a wheel tractor scraper.

14. The machine of claim 11, wherein to determine an area of the contour, the controller is further configured to execute the instructions to count a number of pixels within the contour.

15. The machine of claim 11, wherein to filter the image, the controller is configured to execute the instructions to:
identify pixels corresponding to features in the image;
calculate motion vectors for the identified pixels; and
remove pixels corresponding to motion vectors having a magnitude greater than a threshold.

16. The machine of claim 11, wherein the controller is further configured to execute the instructions to remove, from the image, distortion caused by a wide-angle lens before determining the area.

* * * * *